United States Patent
Yuan et al.

(10) Patent No.: US 8,203,691 B2
(45) Date of Patent: Jun. 19, 2012

(54) HIGH EXTINCTION RATIO LIQUID CRYSTAL OPTICAL SWITCH

(75) Inventors: Haijun Yuan, Pleasanton, CA (US); Xuehua Wu, Union City, CA (US); Christopher Lin, El Cerrito, CA (US); Giovanni Barbarossa, Saratoga, CA (US)

(73) Assignee: Oclaro (North America), Inc., San Jose, CA (US)

( * ) Notice: Subject to any disclaimer, the term of this patent is extended or adjusted under 35 U.S.C. 154(b) by 1115 days.

(21) Appl. No.: 12/014,730

(22) Filed: Jan. 15, 2008

(65) Prior Publication Data

US 2008/0218680 A1 Sep. 11, 2008

Related U.S. Application Data

(60) Provisional application No. 60/893,872, filed on Mar. 8, 2007.

(51) Int. Cl.
*G02F 1/13* (2006.01)
*G02B 27/28* (2006.01)

(52) U.S. Cl. ..... 349/196; 349/96; 349/117; 359/484.06; 359/489.08

(58) Field of Classification Search ............ 385/16, 385/18, 22; 349/196, 96, 117; 359/320, 359/487.04, 489.04, 489.15
See application file for complete search history.

(56) References Cited

U.S. PATENT DOCUMENTS

| 5,724,165 | A | 3/1998 | Wu |
| 6,307,677 | B2 | 10/2001 | Cao |
| 6,320,996 | B1 | 11/2001 | Scobey et al. |
| 6,421,480 | B2 | 7/2002 | Cao |
| 6,594,082 | B1 | 7/2003 | Li et al. |
| 2003/0035605 | A1 | 2/2003 | Bouevitch et al. |
| 2004/0008932 | A1* | 1/2004 | Peng et al. ............ 385/27 |
| 2004/0051820 | A1 | 3/2004 | Yuan et al. |

FOREIGN PATENT DOCUMENTS

| EP | 1 523 212 | 4/2005 |
| WO | WO 01/23912 | 4/2001 |

OTHER PUBLICATIONS

EP Search Report from Application No. EP 08 15 2469 dated Jun. 17, 2008.

* cited by examiner

*Primary Examiner* — Uyen Chau N Le
*Assistant Examiner* — Michael Mooney
(74) *Attorney, Agent, or Firm* — Patterson & Sheridan, L.L.P.

(57) ABSTRACT

An optical switch for performing high extinction ratio switching of an optical signal includes a beam polarizing element and one or more optical elements. The optical elements are configured to direct an optical signal along a first or second optical path based on the polarization state of the optical signal as it passes through the optical elements. The optical switch performs high extinction ratio switching of the optical signal by preventing unwanted optical energy from entering an output port by using an absorptive or reflective optical element or by directing the unwanted optical energy along a different optical path.

3 Claims, 6 Drawing Sheets

HIGH EXTINCTION RATIO LIQUID CRYSTAL OPTICAL SWITCH

CROSS-REFERENCE TO RELATED APPLICATIONS

This application claims the benefit of U.S. Provisional Patent Application Ser. No. 60/893,872, filed Mar. 8, 2007, entitled "Wavelength Selective Liquid Crystal Switch," the entire contents of which are incorporated by reference herein.

BACKGROUND OF THE INVENTION

1. Field of the Invention

Embodiments of the present invention relate generally to optical communication systems and components and, more particularly, to a liquid crystal-based optical switch.

2. Description of the Related Art

In optical communication systems, it is sometimes necessary to perform 1×2 switching of an optical signal, where an input light beam enters an optical switching device through an input fiber and is directed to one of two output fibers. There are also more complicated optical switches, such as 2×2, 1×N, and N×N optical switches, which are realized by combining several 1×2 optical switches.

One means for redirecting a light beam along different optical paths in optical communications systems is the mechanical optical switch. A mechanical optical switch has a movable optical part, such as a prism, mirror, or segment of optical fiber, which can be positioned to direct a light beam along one or more alternate optical paths. Drawbacks of mechanical optical switches include slow switching speeds and problematic reliability. Therefore, there has been an ongoing effort in the development of non-mechanical switches for use in optical communications systems.

Liquid crystal (LC) based optical switches are known and used in the art for routing optical signals without the disadvantages of mechanical optical switches. When a potential difference is applied across an LC material, the molecular orientation of the liquid crystals in the LC material become aligned in a known direction. Because the molecular orientation of an LC material changes the polarization plane of incident light, the application of a potential difference across a cell containing an LC material may be used to modulate the polarization of polarized light passing through the cell. For example, in a first state, wherein a potential difference of approximately zero V is applied and maintained across the LC cell, linearly polarized light passing therethrough is rotated 90°. In a second state, wherein a predetermined potential difference, e.g., 5 volts, is applied across the LC cell, linearly polarized light passes therethrough essentially unchanged. The light beam may then be directed through an optical steering element, such as a birefringent crystal, which directs the light beam along one of two optical paths based on the polarization state of the light beam.

Unlike the reflective surfaces of mechanical optical switches, an LC-based optical steering device directs light to different paths by controlling allocation of energy to the two linear orthogonal polarization modes, e.g., p- or s-polarization, via voltages applied to the LC cell. By controlling the voltage applied to the LC cell, all light energy can be allocated to one polarization mode and completely blocked to the other mode, or partially allocated to both modes. These controlling voltages provide the potential switch states. However, the voltage tolerance for these states is usually not the same, resulting in a low extinction ratio.

FIG. 1 illustrates the electro-optical response of a twisted-nematic (TN) LC commonly used in the art. The abscissa represents the potential difference, in volts, applied across the LC, and the ordinate represents the corresponding attenuation, in decibels, of light directed through the LC, where 0 dB of attenuation indicates 100% of the incident optical energy is transmitted. In this example, the incident light is initially p-polarized. EO curves 101 and 102 depict the intensity of the s-polarized component and the p-polarized component in the light after p-polarized light passes through the LC cell. For example, at zero volts, the intensity of p-polarized light is around −22 dB, and the intensity of s-polarized light is approximately 0 dB, indicating the LC converts most of the p-polarized light to s-polarized light. At 10 volts, the intensity of p-polarized light is approximately 0 dB and the intensity of s-polarized light is less than −45 dB, indicating the LC converts a very small portion of incident light to s-polarization. For each curve, the magnitude of attenuation is equivalent to the blocking ratio of the LC, which, as shown in FIG. 1, is asymmetrical between s- and p-polarized light.

For example, to allow transmission of incident p-polarized light without changing the polarization thereof, a potential difference of about 4 or more volts is applied across the LC. EO curve 101 indicates that, when approximately 4.0 or more volts is applied across the LC, essentially no s-polarized light is produced thereby. The electro-optical response of the LC is such that the blocking ratio for s-polarized light is about −40 dB, meaning that only about 0.01% of incident light transmitted through the LC is converted to s-polarized. EO curve 102 indicates that essentially all the incident light is transmitted as p-polarized light when about 4.0 or more volts is applied across the LC. Hence, across a wide voltage range, the LC has a very high blocking ratio when a potential difference greater than about 4.0 volts is applied thereacross.

Conversely, to rotate the polarization of incident p-polarized light 90°, a potential difference of less than about 1.2 volts is applied across the LC. EO curve 101 indicates that, when approximately 1.2 volts or less is applied across the LC, most light transmitted therethrough is s-polarized, i.e., the attenuation of s-polarized light approaches zero. However, EO curve 102 also indicates that the LC has a high blocking ratio of −40 dB for p-polarized light only over a narrow range of control voltage, which is essentially between 1.12-1.20 volts. When a potential difference of less than about 1.12 volts is applied across the LC, attenuation of p-polarized light may be as little as about −20 dB, and up to about 1% of the incident light may be transmitted with no change in polarization. Therefore, even a small variation or drift in applied control voltage, e.g., ±0.1 V, will result in a significant portion of incident light to be transmitted by the LC as p-polarized light. Because an optical steering element subsequently directs a light beam from the LC to different output ports based on the polarization state of the light beam, an unacceptably large portion of the light beam may be directed to an inactive output port when the LC has a low blocking ratio.

In an ideal 1×2 switching operation, an input beam is directed along one optical path and is completely blocked from a second optical path, so that none of the input beam is directed to an inactive output port. This avoids cross-talk, erroneous signals, and other optical network issues. Therefore, optical switches having a high extinction ratio are desirable in optical communications systems. Extinction ratio, which is typically expressed as either a fraction or in dB, is defined as the ratio of optical energy directed to an active output port to the optical energy directed to an inactive output port. Preferably, the optical power level directed to an active output port is three or four orders of magnitude greater than the optical power level directed to an inactive port, i.e., the optical power directed to the inactive port is attenuated −30 to −40 dB.

While LC-based optical switches have advantages over mechanical optical switches, the low blocking ratios inherent with LCs can result in poor extinction ratio for an LC-based optical switch. To reliably improve the extinction ratio of LC-based optical switches, LCs are positioned in series to perform multiple conditioning steps on an input beam, thus compounding the effective blocking ratio of an optical switch. In this way, even when a first LC only has a blocking ratio of −20 dB for light in an unwanted polarization state, a second LC can condition the input beam a second time to produce an effective blocking ratio of −40 dB for the optical switch. This approach, however, requires two or more LCs for a given input beam, substantially adding to the complexity of an optical switching. For example, it is necessary to fabricate and align twice as many LC cells and implement twice as many control electrodes for these LC cells.

In light of the above, there is a need in the art for a non-mechanical optical switch for use in an optical network capable of performing high-extinction ratio switching of a light beam.

SUMMARY OF THE INVENTION

Embodiments of the present invention provide an optical switch for performing high extinction ratio switching of an optical signal. The optical switch includes a beam polarizing element and one or more optical elements arranged so that the beam polarizing element conditions the optical signal twice.

In one embodiment, an optical device comprises a beam polarization unit positioned in an optical path of an input beam and a residual component of the input beam, and an optical element for reducing an intensity of the residual component of the input beam that reaches an inactive output port, based on a polarization state of the residual component. The optical device may further comprise a beam steering unit for directing a primary component of the input beam along a first optical path and the residual component of the input beam along a second optical path, and a beam reflecting element positioned in the first optical path and the second optical path to cause the primary component of the input beam to pass through the beam polarization unit a second time and to cause the residual component of the input beam to pass through the beam polarization unit a second time. The beam polarization unit may comprise a liquid crystal (LC) pixel through which the input beam, the primary component of the input beam and the residual component of the input beam pass.

In another embodiment, a wavelength selective switch comprises a wavelength dispersive element for separating an input beam into its wavelength components and a liquid crystal switch for directing each of the wavelength components to a primary optical path and a residual optical path. In this embodiment, the liquid crystal switch includes a beam polarization unit that is positioned in an optical path of one of the wavelength components and in the primary optical path and the residual optical path of that wavelength component. The wavelength selective switch may further comprise a beam steering unit for directing each of the wavelength components to the primary optical path and the residual optical path and a beam reflecting element. The beam reflecting element is positioned in the primary optical path and the residual optical path to cause a light beam traveling along the primary optical path to reflect off the beam reflecting element and pass through the beam polarization unit and a light beam traveling along the residual optical path to reflect off the beam reflecting element and pass through the beam polarization unit. The beam polarization unit may comprise an array of liquid crystal (LC) pixels.

According to another embodiment, in an optical device having first and second output ports, a method for switching an input beam to the first output port comprises passing the input beam through a beam polarization unit and directing a primary component of the input beam along a first optical path and a residual component of the input beam along a second optical path, directing the primary component of the input beam to the first output port through the beam polarization unit, and directing the residual component of the input beam to the second output port through the beam polarization unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention contemplate an LC-based optical switching device capable of performing high extinction ratio switching of an optical signal with a minimal number of LCs.

Figure 2:
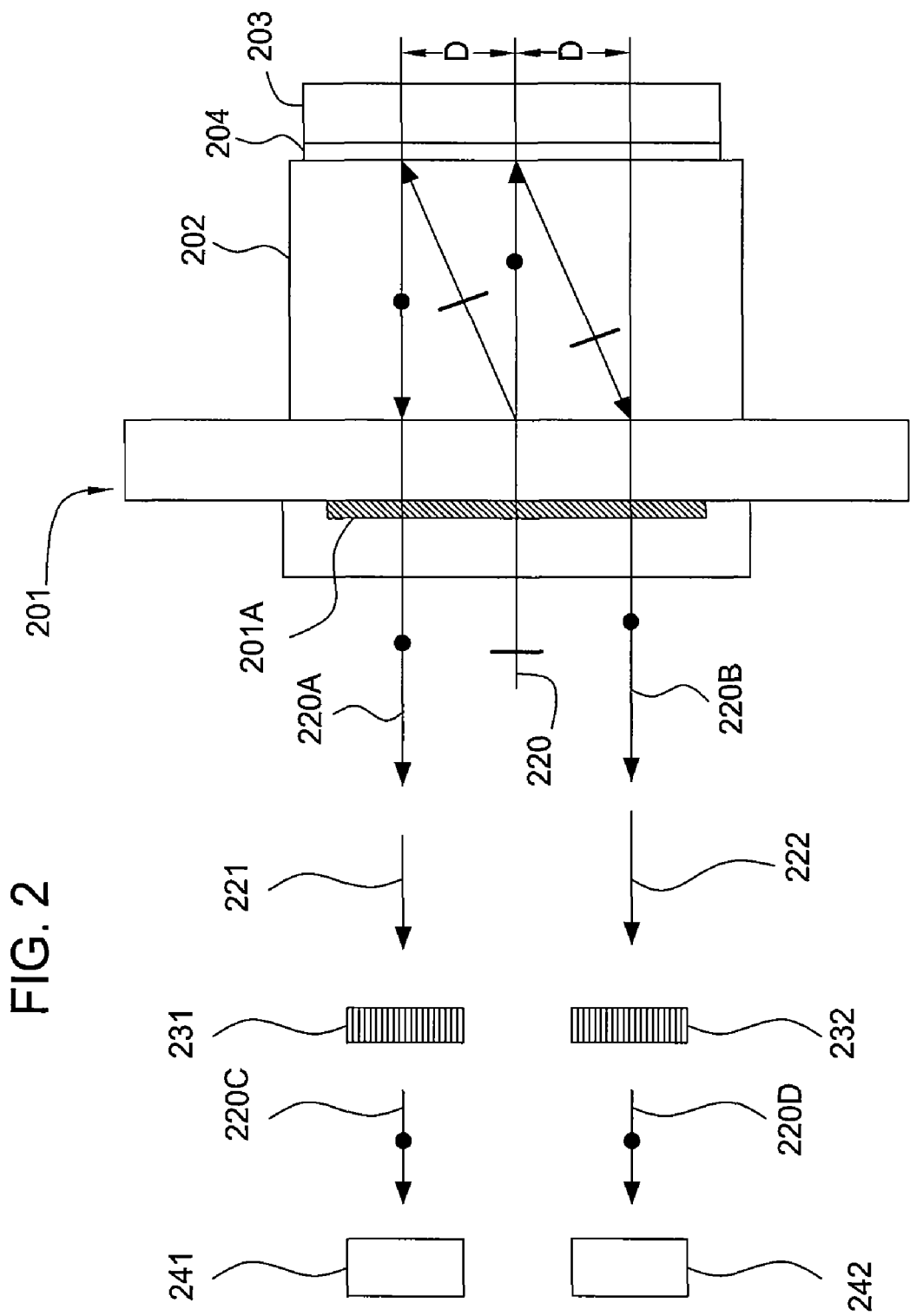
FIG. 2 illustrates a schematic side view of an LC-based optical switch according to an embodiment of the invention.

FIG. 2 illustrates a schematic side view of an LC-based optical switch, according to an embodiment of the invention. Optical switch 200 is configured to provide 1×2 switching of an optical input signal 220 between two output ports 241 and 242. Optical switch 200 performs the 1×2 switching operation between output ports 241 and 242 with a high extinction ratio in the following manner. As a consequence, optical switch 200 directs an optical signal to the selected, or active, optical output port having a power level that is about 30-40 dB greater than the optical power directed to the inactive optical output port. Optical switch 200 includes an LC switch cell 201, a birefringent crystal 202 mounted adjacent LC switch cell 201, a mirror 203 mounted adjacent birefringent crystal 202, and polarization-sensitive optical elements 231, 232 positioned between LC switch cell 201 and output ports 241, 242, respectively. LC switch cell 201 consists of substrates with a pixelized electrode and an LC liquid 201A. In one configuration, mirror 203 is assembled together with a quarter wave plate. LC switch cell 201, birefringent crystal 202, and mirror 203 are optically coupled and are configured to redirect an optical input signal 220 back through LC switch cell 201. In the example illustrated in FIG. 2, mirror 203 has a quarter wave plate 204 mounted thereon to rotate the polarization of incident light by 90°. In this way, optical input signal 220 is reflected from mirror 203 to pass through the birefringent crystal 202 along a different exit path, i.e., optical path 221 or 222. Hence, a light beam leaving optical switch 200 has a different position and a different polarization state than optical input signal 220.

Birefringent crystal 202 is a beam displacer, such as a $YVO_4$ crystal, that produces a spatial displacement D between the s- and p-components of a linearly polarized input beam. By optically coupling birefringent crystal 202 with LC 201A, a linearly polarized beam may be selectively directed along one of two optical output paths, i.e., optical path 221, or optical path 222, depending on the control voltage applied across LC 201A, where optical path 221 is directed at output port 241 and optical path 222 is directed at output port 242. For example, optical input signal 220 is initially p-polarized (denoted by the vertical line through the arrow representing optical input signal 220), and passes through LC 201A. To direct optical input signal 220 along optical path 221, LC 201A is set so that the polarization of optical input signal 220 is not converted to s-polarized light, i.e., LC 201A has a potential difference of at least about +4 V applied thereacross. LC 201A is configured with the twisted nematic LC discussed in conjunction with FIG. 1, or an LC with similar electro-optical properties, so a potential difference of 4 V allows the transmission of p-polarized light with virtually zero attenuation. In this way, essentially all of the optical energy contained in optical input signal 220 is diverted upwards by birefringent crystal 202, reflected by mirror 203, converted to s-polarized light (denoted by a dot) by quarter wave plate 204, and directed back to LC 201A along optical path 221 as optical signal 220A. Conversely, optical input signal 220 may be directed along optical path 222 by applying a potential difference to LC 201A of less than about 1.2 V. Optical input signal 220 is then converted to s-polarized light, passes undiverted through birefringent crystal 202, is reflected by mirror 203, is converted to p-polarized light by quarter wave plate 204, and is directed back to LC 201A along optical path 222 as optical output signal 220B. Hence, optical switch 200 performs 1×2 switching of optical input signal 220 between optical paths 221 and 222.

When output port 241 is selected as the active output port for optical switch 200, optical input signal 220 is converted to optical signal 220A, as described above, which then passes through polarization-sensitive optical element 231 via optical path 221, to produce output signal 220C. Polarization-sensitive optical element 231 only allows light of a desired polarization to reach output port 241. In the example shown, polarization-sensitive optical element 231 is an absorptive polarizer designed to transmit light of a single polarization, in this case s-polarized light, and to absorb or reflect all other incident light. One example of an absorptive polarizer is a wire-grid polarizer. Alternatively, polarization-sensitive optical element 231 may be a birefringent beam displacer similar to birefringent crystal 202, that is oriented to direct the s-polarized component of optical signal 220A, i.e., output signal 220C, to output port 241. Polarization-sensitive optical element 231 directs any p-polarized component of optical signal 220A elsewhere, e.g., to a loss port. Similarly, when output port 242 is selected as the active output port for optical switch 200, optical input signal 220 is converted to optical signal 220B, which passes through polarization-sensitive optical element 232 via optical path 222, to produce output signal 220D. Polarization-sensitive optical element 232 is substantially similar in operation to polarization-sensitive optical element 231, therefore output signal 220D consists of the s-polarized component of optical signal 220B, and any p-polarized component optical signal 220B is either absorbed, reflected, or directed away from output port 242.

Despite using a single LC to condition optical input signal 220, optical switch 200 provides a high extinction ratio between output ports 241 and 242. This is because when an optical signal is routed by optical switch 200, unwanted optical energy is conditioned twice by LC 201A, as described above, before entering an inactive output port of optical switch 200. This greatly reduces the intensity of light directed at the inactive output port, resulting in a high extinction ratio.

Figure 1:
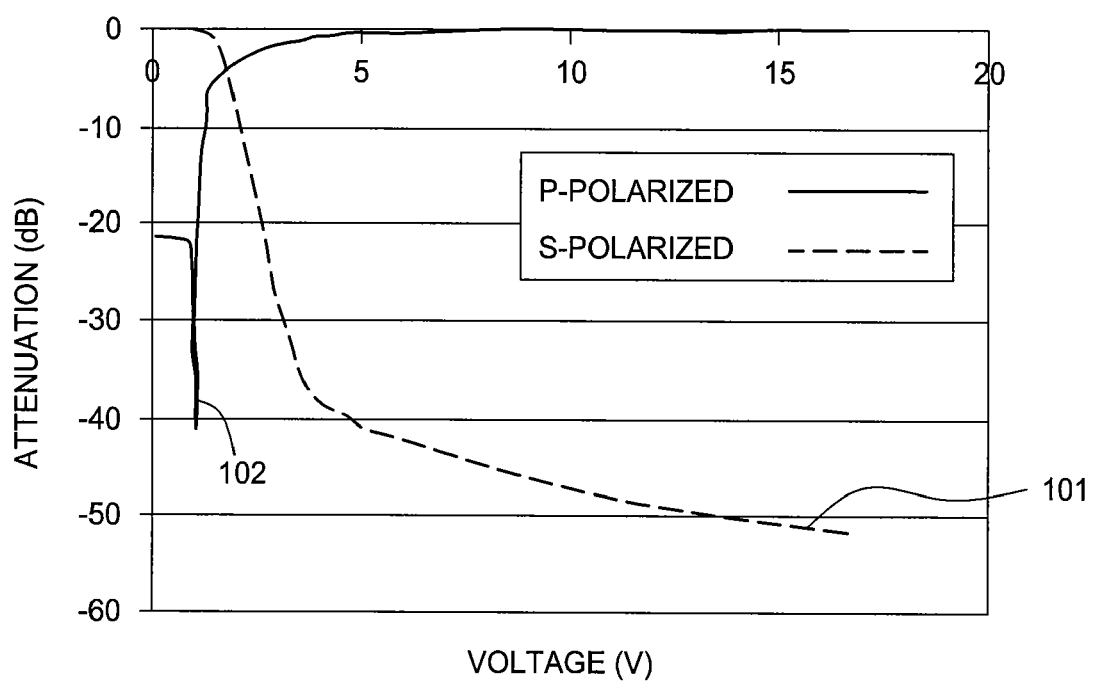
FIG. 1 illustrates the electro-optical response of a twisted-nematic LC commonly used in the art.

For example, when output port 242 is the active output port for optical switch 200, LC 201A is set to change the polarization of optical input signal 220 by the application of a potential difference of less than about 1.2 V. Referring to FIG. 1, this potential difference converts most of optical input signal to s-polarized light, but unless the potential difference is precisely controlled in the narrow band of 1.12-1.20 volts, the attenuation of p-polarized light is only about −20 dB. In other words, about 1% of the light transmitted by LC 201A remains p-polarized and needs to be further attenuated, because the p-polarized light is directed upwards by birefringent crystal 202 and follows optical path 221 to the inactive output port, i.e., output port 241. If left unattenuated, this p-polarized light contains enough optical energy to act as unwanted leakage or a cross-talk signal into the inactive output port. However, optical switch 200 is configured so that the unwanted leakage signal reflects off quarter wave plate 204 to be converted back to s-polarized light and passes through LC 201A a second time, and is converted back to 99% p-polarized light, so that about 99% of the unwanted leakage signal is absorbed, reflected, or redirected by polarization-sensitive optical element 231, i.e., an additional −20 dB attenuation of the unwanted leakage signal occurs.

In another example, output port 241 is the active output port for optical switch 200. In this case, LC 201A is set to maintain the same polarization of optical input signal 220 by the application of a potential difference of about 4 V or greater. Referring to FIG. 1, the majority of the optical input signal remains p-polarized, which is directed to output port 241. Between −30 and 40 dB of input signal is transmitted as s-polarized light, and is directed toward an inactive output port, i.e., output port 242. The s-polarized light passes undiverted through birefringent crystal 202, is reflected by mirror 203, is converted to p-polarized light by quarter wave plate 204, and is directed back through LC 201A as optical output signal 220B. Most of the unwanted leakage signal remains p-polarized, since more than 4 volts is applied to LC 201A. Thus, when this signal is absorbed, reflected, or redirected by polarization-sensitive optical element 232, an additional −30 to −40 dB attenuation of the unwanted leakage signal is achieved.

In addition, with the arrangement depicted in FIG. 2, when quarter wave plate 204 has a low extinction ratio, i.e., when light reflected from mirror 203 and quarter wave plate 204 do not fully undergo polarization conversion, the unwanted leakage from quarter wave plate 204 will be redirected back to input position 220 and will not contribute to cross talk to active optical ports 241 and 242.

In the embodiment described in conjunction with FIG. 2, an optical switch provides high extinction ratio, 1×2 switching of an optical input signal between two output ports using a single LC. This is accomplished by using the LC to condition unwanted optical energy twice. Although the optical switch described in this embodiment directs unwanted optical energy toward an inactive output port during the switching process, only unwanted energy having the same polarization state as an output signal actually enters the output port. The portion of unwanted optical energy having the same polarization state as an output signal has been attenuated twice, as described above, and has negligible intensity, i.e., −40 dB or less of the original input signal. The portion of unwanted optical energy having a different polarization state than an output signal may only be attenuated −20 dB of the original input signal, but is easily prevented from entering the output port by a polarization-sensitive optical element.

In optical communication systems that employ wavelength division multiplexing (WDM), information is carried by multiple channels, each channel having a unique wavelength. WDM allows transmission of data from different sources over the same fiber optic link simultaneously, since each data source is assigned a dedicated channel. The result is an optical communication link with an aggregate bandwidth that increases with the number of wavelengths, or channels, incorporated into the WDM signal. In WDM optical communication systems, it is often necessary to add, drop, or switch one or more wavelength channels between multiple network destinations. This can be achieved by an optical switching device, such as a wavelength selective switch (WSS), which directs an input light beam to one of multiple output optical paths. For example, in a 1×4 optical switching device, an input light beam enters through an input fiber and is directed to one of four output fibers. In some optical networks, such a light beam may consist of a plurality of wavelength channels, and in other situations the individual wavelength channels of a WDM input signal are directed to different output fibers by an optical switching device.

Figure 3A:
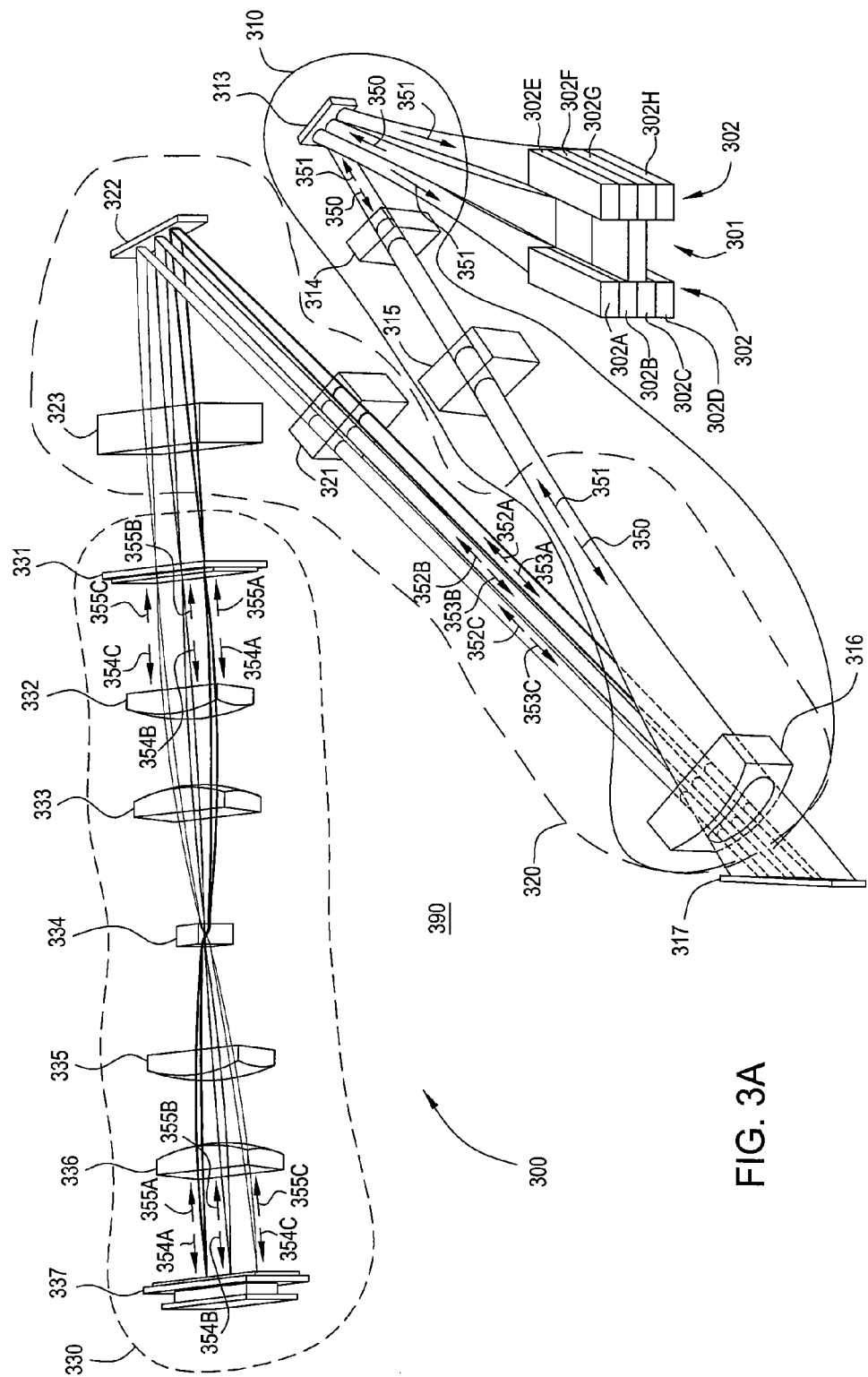
FIG. 3A is a perspective view of a wavelength selective switch that performs 1×4, high extinction ratio switching of a WDM signal, according to an embodiment of the invention.

FIG. 3A is a perspective view of a WSS that performs 1×4, high extinction ratio switching of a WDM signal, according to an embodiment of the invention. Similar to optical switch 200, described above in conjunction with FIG. 2, WSS 300 obtains high extinction ratio switching by using LCs in a bi-directional manner to minimize the intensity of unwanted optical energy directed to inactive output ports during the switching process. WSS 300 performs multiple steering operations to direct an input signal between four output ports and also to direct unwanted optical energy to one or more loss ports. In this way, high extinction ratio switching is realized between the four output ports, since unwanted optical energy is directed away from any output ports of WSS 300.

WSS 300 is a 1×4 WSS and includes an optical input port 301, an optical output port array 302, a first beam shaping/steering section 310, a diffraction grating 317, a second beam shaping/steering section 320, and a switching optics assembly 330. The components of WSS 300 are mounted on a planar surface 390 that is herein defined as the horizontal plane for purposes of description. In the example described herein, planar surface 390 is substantially parallel to the plane traveled by light beams interacting with WSS 300. Also for purposes of description, the configuration of WSS 300 described herein performs wavelength separation of a WDM signal in the horizontal plane and switching selection, i.e., channel routing, in the vertical plane.

For illustrative purposes, inbound light beams 350, 352A-C, 354A-C, and outbound light beams 351, 353A-C, 355A-C are shown in FIG. 3A to more clearly indicate the optical coupling of various elements of WSS 300. Because of the bi-directional nature of most components of WSS 300, light beams are directed along parallel inbound and outbound paths simultaneously between optical components of WSS 300. A number of the inbound and outbound paths are displaced from each other vertically, and this vertical displacement is further described below. For clarity, a single light beam is used in FIG. 3A to schematically represent both an inbound and outbound light beam between two optical components of WSS 300 rather than two beams that are vertically displaced with respect to one another. For example, inbound light beam 350 and outbound light beam 351 are schematically represented by a single light beam between folding mirror 313 and diffraction grating 317.

Optical input port 301 optically couples a WDM optical input signal (not shown) to WSS 300. Optical output port array 302 is, in the configuration shown in FIG. 3A, positioned proximate input port 301. Optical output port array 302 includes four vertically aligned optical output ports 302A-D and four vertically aligned loss ports 302E-H. Optical output ports 302A-D act as the optical output interface between WSS 300 and other components of a WDM optical communication system. Loss ports 302E-H serve as termini for light beams consisting of unwanted optical energy, such as light having incomplete conversion of its polarization state by the LC arrays of WSS 300 which would otherwise be directed to an output port.

First beam shaping/steering section 310 includes a folding mirror 313, beam steering unit 314, and cylindrical lenses 315 and 316. First beam shaping/steering section 310 optically couples diffraction grating 317 with optical input port 301 and optical output port array 302, and shapes inbound beam 350 and outbound beam 351. First beam shaping/steering section 310 is also configured to direct outbound beam 351 or each of its constituent wavelength channels to either loss ports 302E-H or to optical output ports 302A-D, depending on the polarization state of outbound beams 353A-C. In this way, high extinction ratio switching is realized between the four output ports, since the majority of unwanted optical energy is directed to loss ports 302E-H. Inbound beam 350 and outbound beam 351 each contain a plurality of wavelength channels that are multiplexed into a single, "white" beam.

Beam steering unit 314 is configured to direct outbound beam 351, or the individual wavelength components thereof, along two different optical paths, depending on the polarization state of outbound beam 351 or its wavelength components. The two paths may be separated in the horizontal plane by an angular or translational offset. Beam steering unit 314 may be a Wollaston prism, which angularly deflects light beams at different angles depending on the orthogonal polarization states of the beams, or a birefringent crystal, such as a $YVO_4$ crystal, which translationally deflects the light beams by different amounts depending on their orthogonal polarization states.

Cylindrical lens 315 vertically collimates inbound beam 350, and cylindrical lens 316 horizontally collimates inbound beam 350. Together, cylindrical lenses 315, 316 shape inbound beam 350 so that the beam is elliptical in cross-section and collimated in the x- and y-directions when incident on diffraction grating 317, wherein the major axis of the ellipse is parallel with the horizontal plane.

Diffraction grating 317 is a vertically aligned reflective diffraction grating configured to spatially separate, or demultiplex, each wavelength channel of inbound beam 350 by directing each wavelength along a unique optical path. In so doing, diffraction grating 317 forms a plurality of inbound beams, wherein the number of inbound beams corresponds to the number of optical wavelength channels contained in inbound beam 350. In FIG. 3A, diffraction grating 317 is shown to separate inbound beam 350 into three inbound beams 352A-C. However, in practice, the number of optical channels contained in inbound beam 350 may be up to 50 or more. Because the separation of wavelength channels by diffraction grating 317 takes place horizontally in the configuration shown in FIG. 3A, spectral resolution is enhanced by widening inbound beam 350 in the horizontal plane, as performed by cylindrical lens 316. Diffraction grating 317 also performs wavelength channel combination, referred to as multiplexing, of outbound beams 353A-C into outbound beam 351.

Second beam shaping/steering section 320 includes a folding mirror 322, cylindrical lenses 316, 321, and a focusing lens 323. Second beam shaping/steering section 320 optically couples diffraction grating 317 with switching optics assembly 330, shapes inbound beams 352A-C and outbound beams 353A-C, and focuses inbound beams 352A-C on the first element of switching optics assembly 330, i.e., beam polarization switch 331.

Switching optics assembly 330 includes an LC-based beam polarization switch 331, collimating lenses 332, 333, a beam steering unit 334, collimating lenses 335, 336, and an LC-based beam polarization and steering unit 337. The elements of switching optics assembly 330 are optically linked to enable the optical routing of a WDM input signal entering optical input port 301 to any one of the optical output ports 302A-D or loss ports 302E-H. The optical routing is performed by conditioning (via LC polarization) and vertically displacing inbound beams 352A-C to produce outbound beams 353A-C. Switching optics assembly 330 selectively determines the vertical displacement of each outbound beams 353A-C to correspond to the vertical position of the desired output port, i.e., optical output port 302A, 302B, 302C, or 302D, hence performing a 1×4 optical switching operation. The selective vertical displacement of inbound beams 352A-C by switching optics assembly 330 is described below in conjunction with FIG. 3C. In addition, switching optics assembly 330 conditions each of inbound beams 352A-C to ensure high extinction ratio switching thereof. This additional conditioning is also described below in conjunction with FIG. 3C.

Beam polarization switch 331 is an LC switch array including two substrates with an array of transparent electrodes and a cavity formed between the electrodes filled with an LC material. The electrodes and LC-containing cavity are configured to condition the polarization of each of inbound beams 352A-C and produce inbound beams 354A-C. The LC switching array and the array of transparent electrodes are also configured to condition the polarization state of outbound beams 355A-C so that each beam, and therefore each wavelength channel of outbound beam 351, may be independently attenuated or directed to one of loss ports 302E-H. The electrodes are arranged vertically and horizontally to define individual LC pixels, the pixels being optically coupled to inbound or outbound beams. A detailed description of the configuration and operation of beam polarization switch 331 is described below in conjunction with FIG. 3C.

Collimating lenses 332, 333 are spherical lenses and are configured to direct and focus inbound beams 354A-C onto beam steering unit 334, and to direct and focus outbound beams 355A-C onto beam polarization switch 331. In the example illustrated in FIG. 3A, two collimating lenses are shown. In other configurations, the function of collimating lenses 332, 333 may be combined into a single lens, or three or more lenses may be used.

Beam steering unit 334 is configured to direct inbound beams 354A-C along two different optical paths, i.e., an upper and a lower path, depending on the polarization state of the beams. As noted above, the polarization state of inbound beams 354A-C is determined by the polarization conditioning performed by beam polarization switch 331. The two optical paths are separated in the vertical direction either angularly or by a translational offset. In either case, the vertical offset between the two possible paths for inbound beams 354A-C indicates that inbound beams 354A-C may be directed to either an upper or lower region of beam polarization and steering unit 337. Beam steering unit 334 is also configured to direct outbound beams 355A-C back through beam polarization switch 331. Similar to beam steering unit 314, beam steering unit 334 may be a Wollaston prism or a birefringent crystal. In contrast to beam steering unit 314, beam steering unit 334 is oriented to impart an angular or translational deflection to beams in the vertical direction, rather than the horizontal direction, as part of the 1×4 switching of wavelength channels in the vertical plane.

Collimating lenses 335, 336 are spherical lenses and are configured to direct and focus inbound beams 354A-C from beam steering unit 334 onto beam polarization and steering unit 337. When inbound beams 355A-C travel along an upper optical path as directed by beam steering unit 334, collimating lenses 335, 336 direct and focus the beams onto an upper region of beam polarization and steering unit 337. On the other hand, when inbound beams 355A-C travel along a lower optical path as directed by beam steering unit 334, collimating lenses 335, 336 direct and focus the beams onto a lower region of beam polarization and steering unit 337. Collimating lenses 335, 336 are also configured to direct outbound beams 355A-C from beam polarization and steering unit 337 to beam steering unit 334. In the example illustrated in FIG. 3A, two collimating lenses 335, 336 are shown. In other configurations, one collimating lens or more than two lenses may perform the function of collimating lenses 335, 336.

Figure 3B:
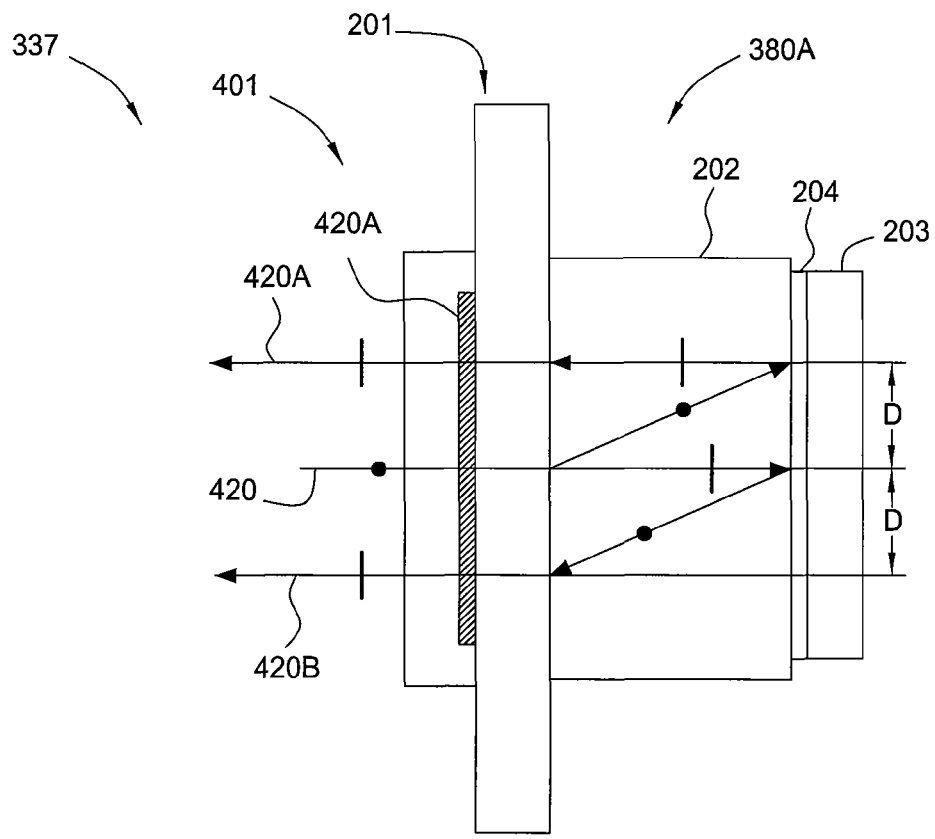
FIG. 3B illustrates a schematic side view of a beam polarization and steering unit, according to an embodiment of the invention.
Figure 3B:
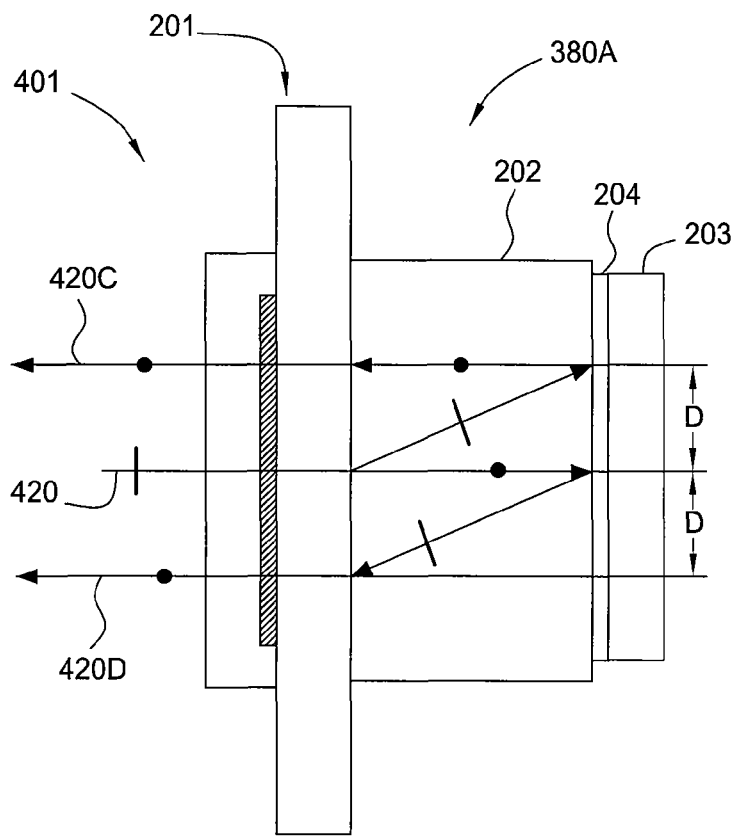

FIG. 3B illustrates a schematic side view of beam polarization and steering unit 337. Because beam polarization and steering unit 337, as described above in conjunction with FIG. 3A, is configured for conditioning light beams incident on both an upper and a lower region thereof, beam polarization and steering unit 337 includes two substantially similar assemblies, upper optical steering device 380A and lower optical steering device 380B. Upper optical steering device 380A is positioned in an upper region of beam polarization and steering unit 337, and lower optical steering device 380B is positioned in a lower region of beam polarization and steering unit 337. Both upper optical steering device 380A and lower optical steering device 380B are similar in configuration and operation to optical switch 200 as described above in conjunction with FIG. 2, and share a number of substantially similar elements therewith. Therefore, identical reference numbers have been used, where applicable, to designate the common elements between optical switch 200 and components of beam polarization and steering unit 337. Because upper optical steering device 380A and lower optical steering device 380B are substantially the same in configuration and operation, only upper optical steering device 380A will be described in detail.

Upper optical steering device 380A includes an LC array 401, which contains a plurality of LC pixels that are substantially similar in organization and operation to LC switch cell

201, in FIG. 2. Each LC switch cell 201 of LC array 401 is positioned to correspond to a unique wavelength channel that may be directed onto upper optical steering device 380A, i.e., inbound beams 354A-C. Upper optical steering device also includes a birefringent crystal 202, a mirror 203 mounted adjacent birefringent crystal 202, and a quarter wave plate 204. In a manner similar to that described above in conjunction with FIG. 2, optical steering device 380A switches an optical input beam, in this case beam 420, between two optical paths and changes the polarization state of the input beam to produce outgoing beams 420A and/or 420B. Beam 420 corresponds to one of inbound beams 354A-C in FIG. 3A, and outgoing beams 420A, 420B correspond to outbound beams 355A-C in FIG. 3A. Outgoing beams 420A-D are also described in conjunction with FIG. 3C, as part of the description of how beam polarization switch 331 performs high extinction ratio switching of wavelength channels.

Beam polarization and steering unit 337 is configured to direct each incident beam, i.e., inbound beams 354A-C, along two different parallel optical paths, separated by a vertical offset. This is the 1×2 optical switching performed by upper optical steering device 380A and/or lower optical steering device 380B on inbound beams 354A-C. Since each of inbound beams 354A-C may be directed to beam polarization and steering unit 337 along two possible sets of optical paths from beam steering unit 334, i.e., an upper path or lower path, outbound beams 355A-C may be directed from beam polarization and steering unit 337 along any of four vertically displaced optical path sets, which are represented by outgoing beams 420A-D in FIGS. 3B and 3C.

Figure 3C:
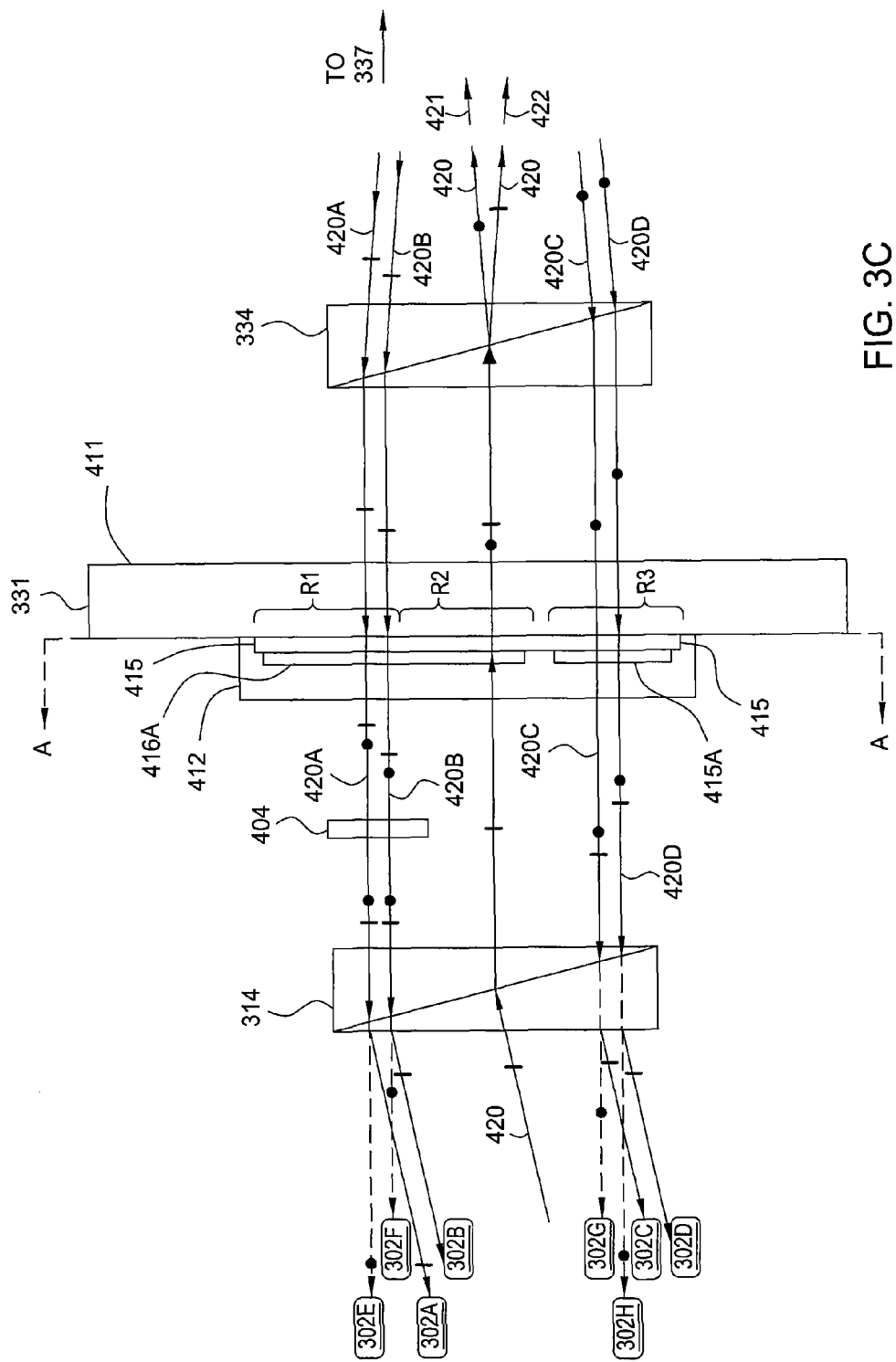
FIG. 3C schematically illustrates a cross sectional view of a beam polarization unit according to an embodiment of the invention.

FIG. 3C schematically illustrates a cross sectional view of beam polarization switch 331, which is contained in switching optics assembly 330. Also depicted in FIG. 3C are beam steering unit 314 and beam steering unit 334. Taken together, beam polarization switch 331, beam steering unit 314, beam steering unit 334, and beam polarization and steering unit 337 (not shown in FIG. 3C) provide 1×4, high extinction ratio optical beam routing of beam 420 between optical output ports 302A-D and/or loss ports 302E-H.

Beam polarization switch 331 is positioned between beam steering unit 314 and beam steering unit 334. Beam steering unit 314 and beam steering unit 334 serve as steering optics for beam polarization switch 331, and, in the example illustrated in FIG. 3C, create an angular displacement between incident light beams having different polarization states. In this example, beam steering unit 314 and beam steering unit 334 are each Wollaston prisms. Cylindrical lenses, focusing lenses, and other optical components of WSS 300 are omitted from FIG. 3C for clarity.

In the example illustrated in FIG. 3C, beam polarization switch 331 includes an LC switch array that has two transparent plates 411, 412, which are laminated together to form an LC cavity 415. LC cavity 415 contains an LC material. Beam polarization switch 331 also includes transparent electrodes to apply a potential difference across LC cavity 415, thereby turning LCs contained therein "off" or "on," i.e., setting each LC to either modulate or not modulate the polarity of incident light. The transparent electrodes include horizontally oriented and vertically oriented electrodes, which may be patterned from indium-tin oxide (ITO) layers. Transparent horizontal electrodes 415A, 416A, are formed on a surface of transparent plate 412, and are positioned adjacent LC cavity 415, respectively, as shown in FIG. 3C. The transparent vertical electrodes for beam polarization switch 331 are shown in FIG. 3D, and together form a vertical electrode array 426.

Figure 3D:
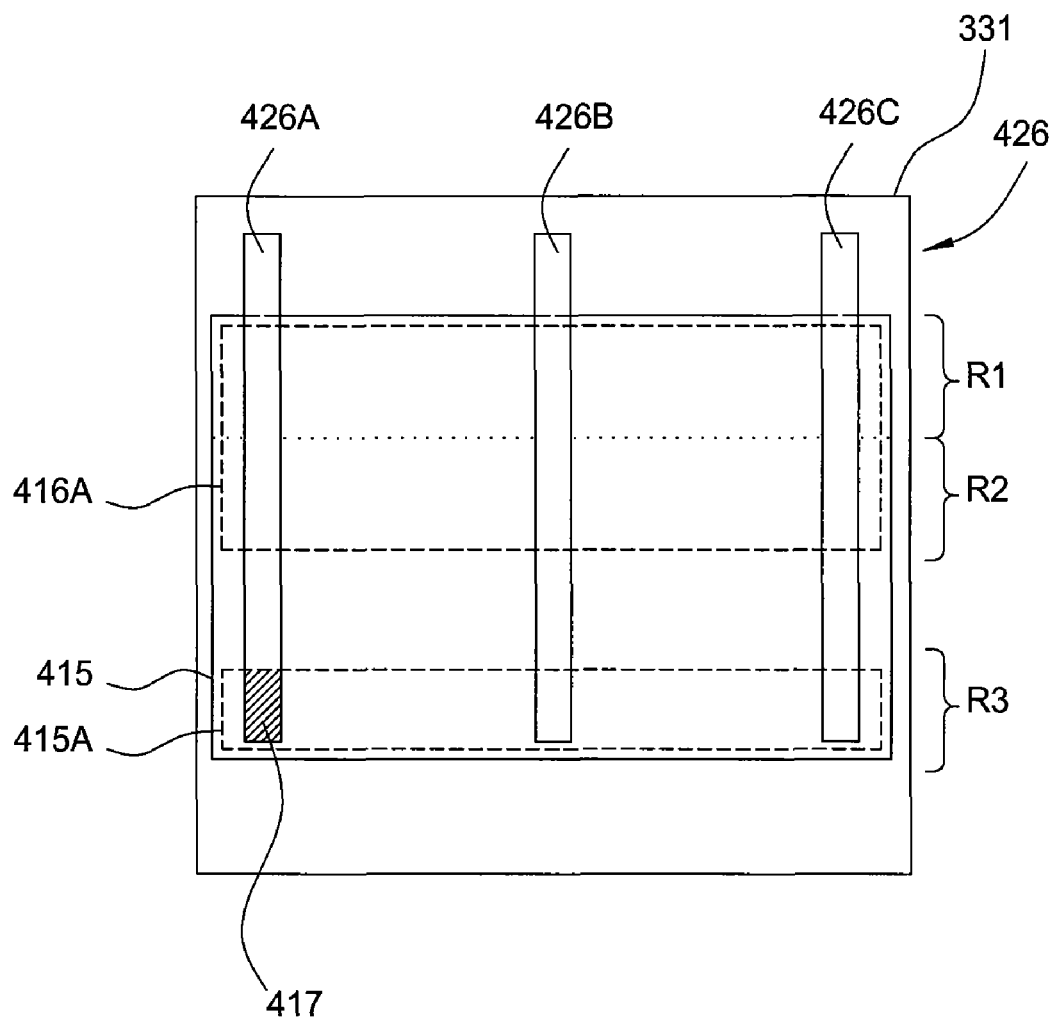
FIG. 3D schematically illustrates a cross-sectional view of the beam polarization unit in FIG. 3C taken at section line a-a, as indicated in FIG. 3C.

FIG. 3D schematically illustrates a cross-sectional view of beam polarization switch 331 taken at section line a-a, as indicated in FIG. 3C. Vertical electrode array 426 is positioned adjacent LC cavity 415, as shown in FIG. 3D. Vertical electrode array 426 includes a plurality of vertical electrodes 426A-C. Each of vertical electrodes 426A-C corresponds to one of the wavelength channels into which an optical input beam is divided prior to processing by beam polarization switch 331, and each vertical electrode is positioned appropriately so that the desired wavelength channel is incident on the requisite vertical electrode. For clarity, vertical electrodes for only three channels are illustrated in FIG. 3D. Vertical electrode arrays configured for 50 or more wavelength channels are also contemplated. Transparent horizontal electrodes 415A, 416A act as common electrodes for all wavelength channels that pass through beam polarization switch 331.

The potential difference developed between the two electrodes of each LC pixel of beam polarization switch 331 conditions an incident beam of linearly polarized light. An LC pixel of beam polarization switch 331 is defined by the region of an LC cavity located between a vertical electrode, e.g., vertical electrode 426A, and a horizontal electrode, such as transparent horizontal electrode 415A or 416A. For example, vertical electrode 426A and horizontal electrode 415A define a single LC pixel 417 (shaded region) of beam polarization switch 331.

Referring back to FIG. 3C, beam polarization switch 331 conditions the polarization state of beam 420 and outgoing beams 420A-D, and beam steering units 314, 334 direct beam 420 and outgoing beams 420A-D along different vertically displaced optical paths based on the polarization state of each beam. Beam 420 corresponds to an individual wavelength channel that is routed by switching optics assembly 330, i.e., any of inbound beams 352A-C. Outgoing beams 420A-D in FIG. 3C correspond to outgoing beams 420A-D produced by beam polarization and steering unit 337 and depicted in FIG. 3B.

LC cavity 415 includes three regions, R1, R2 and R3. Beam steering unit 334 is configured to direct outgoing beams 420A, 420B through region R1 of LC cavity 415, and outgoing beams 420C, 420D through region R3 of LC cavity 415. Beam steering unit 314 directs beam 420 through region R2 of LC cavity 415. Beam steering unit 314 is also configured to direct outgoing beams 420A-D to output ports and/or loss ports, based on the polarization of each incident outgoing beam. Specifically, beam steering unit 314 directs outgoing beam 420A to optical output port 302A when outgoing beam 420A is p-polarized, and to loss port 302E when outgoing beam 420A is s-polarized, as indicated in FIG. 3C. In this way, high extinction ratio switching takes place, since unwanted optical energy, i.e., the portion of beam 420A whose polarization that remains the same after passing through region R1, has a different polarization state than the output signal, and therefore is directed to a loss port rather than an inactive output port. For illustrative purposes, the displacement between optical output port 302A and loss port 302E is shown in the vertical. In practice, beam steering unit 314 is configured to produce an angular offset in the horizontal between s- and p-polarized light beams. Therefore, optical output port 302A and loss port 302E are actually separated by a horizontal displacement. In a similar fashion, beam steering unit 314 directs outgoing beam 420B to optical output port 302B and/or loss port 302F, outgoing beam 420C to optical output port 302C and/or loss port 302G, and outgoing beam 420D to optical output port 302D and/or loss port 302H.

In the example illustrated in FIG. 3C, a quarter wave plate 404 is positioned between beam polarization switch 331 and beam steering unit 314 to rotate the polarization of outgoing beams 420A, 420B by 90°. With this configuration, all light beams directed to optical output ports 302A-D, i.e., output signals, consist entirely of p-polarized light and all light beams directed to loss ports 302E-H, i.e., unwanted optical energy, consist entirely of s-polarized light. Because beam steering unit 314 directs all p-polarized light in a first horizontal direction and all s-polarized light in a second horizontal direction, positioning quarter wave plate 404 as shown in FIG. 3C allows optical output ports 302A-D to be horizontally displaced from loss ports 302E-H and to be configured in a vertically aligned array, such as optical output port array 302 of WSS 300. Alternatively, beam polarization switch 331 may not include quarter wave plate 404. In this case, optical output ports 302A-D are not positioned in a vertically aligned array, and instead are grouped into two horizontally displaced pairs. The functionality of WSS 300 is not affected when optical output ports 302A-D are not grouped in a vertical array.

In operation, beam polarization switch 331, when used in conjunction with beam polarization and steering unit 337, selectively directs a linearly polarized beam 420 to one of four optical output ports, 302A-D, one of four loss ports, 302E-H, or a portion of beam 420 to any combination of the output and loss ports. Beam 420 is a beam of s- or p-polarized light corresponding to a single wavelength channel, which has been demultiplexed from a WDM input signal. In the example shown in FIG. 3C, beam 420 is p-polarized.

Beam 420 passes through beam steering unit 314 and is directed through the LC contained in LC cavity 415. The polarization of beam 420 is adjusted by the LC contained in LC cavity 415 so that the beam is ultimately directed to the desired output and/or loss ports. After passing through LC cavity 415, beam steering unit 334 directs beam 420 to beam polarization and steering unit 337 along an upper optical path 421 or a lower optical path 422. The portion of beam 420 that follows optical path 421 interacts with upper optical steering device 380A, shown in FIG. 3B, and is directed back to beam steering unit 334 as either outgoing beam 420A or outgoing beam 420B. Similarly, the portion of beam 420 that follows optical path 422 interacts with lower optical steering device 380B, shown in FIG. 3B, and is directed back to beam steering unit 334 as outgoing beam 420C or 420D. After beam 420 interacts with either upper optical steering device 380A or lower optical steering device 380B, outgoing beams 420A-D are then directed back through beam polarization switch 331 and are conditioned so that beam steering unit 314 directs each outgoing beam to an output and/or loss port as desired.

Beam polarization switch 331 together with beam steering unit 334 performs an initial 1×2 switching operation on beam 420, and beam polarization and steering unit 337 performs a second 1×2 switching operation on beam 420, thus providing 1×4 switching of beam 420 when taken together. For each 1×2 switching operation, high extinction ratio switching takes place, since unwanted optical energy is directed to one or more loss ports rather than to an inactive output port.

To illustrate, assume that beam polarization switch 331 is set to direct beam 420 to optical output port 302A. Referring to FIG. 3C, beam 420 is initially p-polarized, and is directed through region R2 of LC cavity 415. In order to direct beam 420 to optical output port 302A, the LC pixel in region R2 must be set to convert beam 420 to s-polarized light. For maximum conversion, a potential difference of zero V must be applied across the LC pixel in region R2. To this end, the transparent horizontal electrode 416A is maintained with a bias of +4 V and the vertical electrode for beam 420 is also be set at +4 V. The majority of beam 420, i.e., 99% or more of the optical energy of beam 420, is then converted to s-polarized light, directed upward by beam steering unit 334, and directed to upper optical steering device 380A via upper optical path 421. Beam 420 interacts with upper optical steering device 380A and is directed back to beam steering unit 334 as outgoing beam 420A, which is p-polarized after leaving upper optical steering device 380A. Beam steering unit 334 then directs outgoing beam 420A through region R1 of beam polarization switch 331. The potential difference across region R1 is zero V, since transparent horizontal electrode 416A is maintained with a bias of +4 V and the vertical electrode, in this example, is also +4 V. Thus, at zero V, the LC pixel in region R1 converts outgoing beam 420A to s-polarized light. Quarter wave plate 404 then converts outgoing beam 420A to p-polarized light and beam steering unit 314 steers the beam to optical output port 302A. The small portion of outgoing beam 420A that is not converted to s-polarized light by the LC pixel in region R1 is converted to s-polarized light by quarter wave plate 404, and beam steering unit 314 steers this portion of the beam to loss port 302E. The small portion of outgoing beam 420 that is not converted to s-polarized light by the LC pixel in region R2 is directed by beam steering unit 334 along lower optical path 422 to lower optical steering device 380B, returns as either outgoing beam 420C or 420D, is transmitted through region R3 LC cavity 415 without conversion, and is directed to either loss port 302G or 302H by beam steering unit 314. This unwanted portion of light energy is transmitted through region R3 of LC cavity 415 without conversion to s-polarized light since electrode 415A is maintained with a bias of −4 V and, therefore, there is an 8 V potential difference across region R3 of LC cavity 415.

In the configuration of WSS 300 described herein, beam polarization switch 331 serves as multiple LC arrays, where region R1 of LC cavity 415 operates as an LC array for conditioning outgoing beams 420A, 420B for each wavelength channel, region R2 of LC cavity 415 operates as an LC array for conditioning each wavelength channel that enters switching optics assembly 330 for routing, i.e., beam 420, and region R3 of LC cavity 415 operates as an LC array for conditioning outgoing beams 420C, 420D for each wavelength channel. In practice, however, beam polarization switch 331 is no more complex to fabricate and align than a single LC array. This is because essentially the same lithographic, etching, assembly, and optical alignment operations are required to fabricate and position a single LC array in switching optics assembly 330 as to fabricate and position beam polarization switch 331.

While the foregoing is directed to embodiments of the present invention, other and further embodiments of the invention may be devised without departing from the basic scope thereof, and the scope thereof is determined by the claims that follow.

We claim:

1. An optical device configured to perform high extinction ratio switching of an input beam to an active output port, comprising:
   a beam polarization unit positioned in an optical path of the input beam and a residual component of the input beam;
   an optical element for reducing an intensity of the residual component of the input beam that reaches an inactive output port, based on a polarization state of the residual component;
   a beam steering unit for directing a primary component of the input beam along a first optical path and the residual component of the input beam along a second optical path;

a beam reflecting element positioned in the first optical path and the second optical path to cause the primary component of the input beam to pass through the beam polarization unit a second time and to cause the residual component of the input beam to pass through the beam polarization unit a second time; and a quarter wave plate positioned between the beam steering unit and the beam reflecting element, wherein the beam polarization unit comprises a liquid crystal (LC) pixel through which the input beam, the primary component of the input beam and the residual component of the input beam pass.

2. The optical device according to claim 1, wherein the optical element for reducing the intensity of the residual component of the input beam comprises an absorptive polarizer that absorbs one of p- and s-polarized components of the residual component of the input beam.

3. The optical device according to claim 1, wherein the optical element for reducing the intensity of the residual component of the input beam comprises a beam steering unit that splits the residual component of the input beam into an s-polarized component and a p-polarized component and directs one of p- and s-polarized components of the residual component of the input beam away from the inactive output port.

* * * * *